R. E. FLANDERS.
METAL WORKING MACHINE.
APPLICATION FILED DEC. 31, 1919.
1,368,790.
Patented Feb. 15, 1921.
2 SHEETS—SHEET 2.
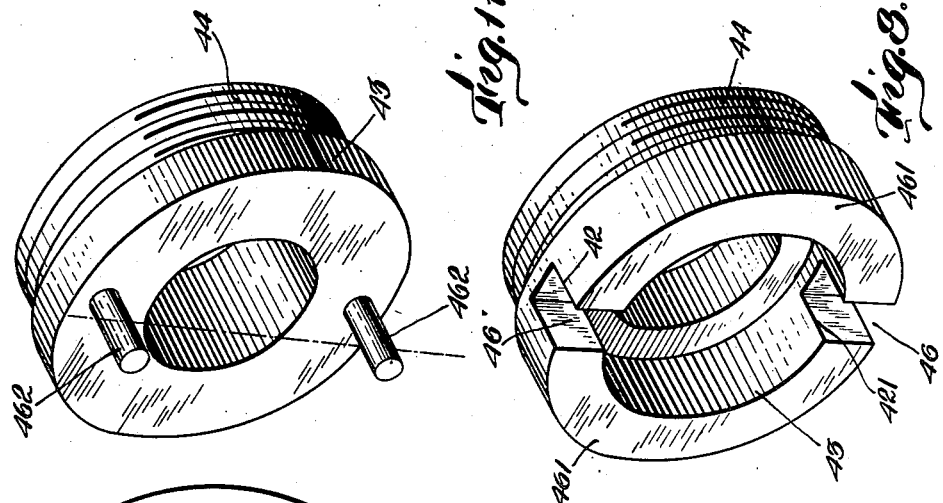
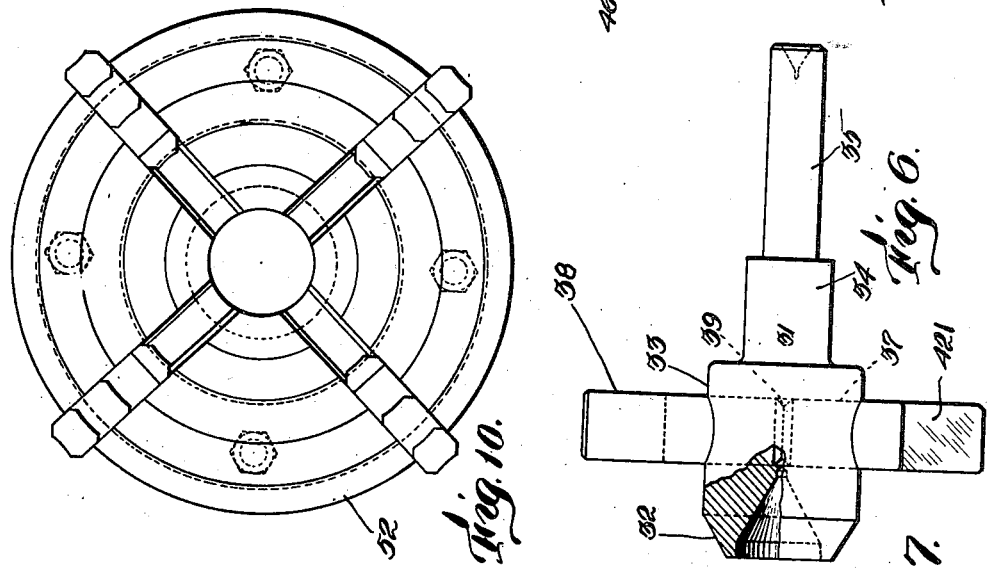
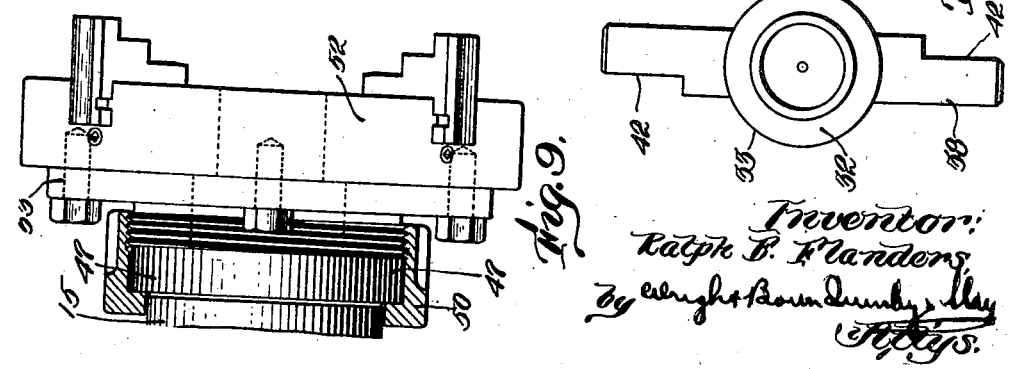
Inventor:
Ralph E. Flanders

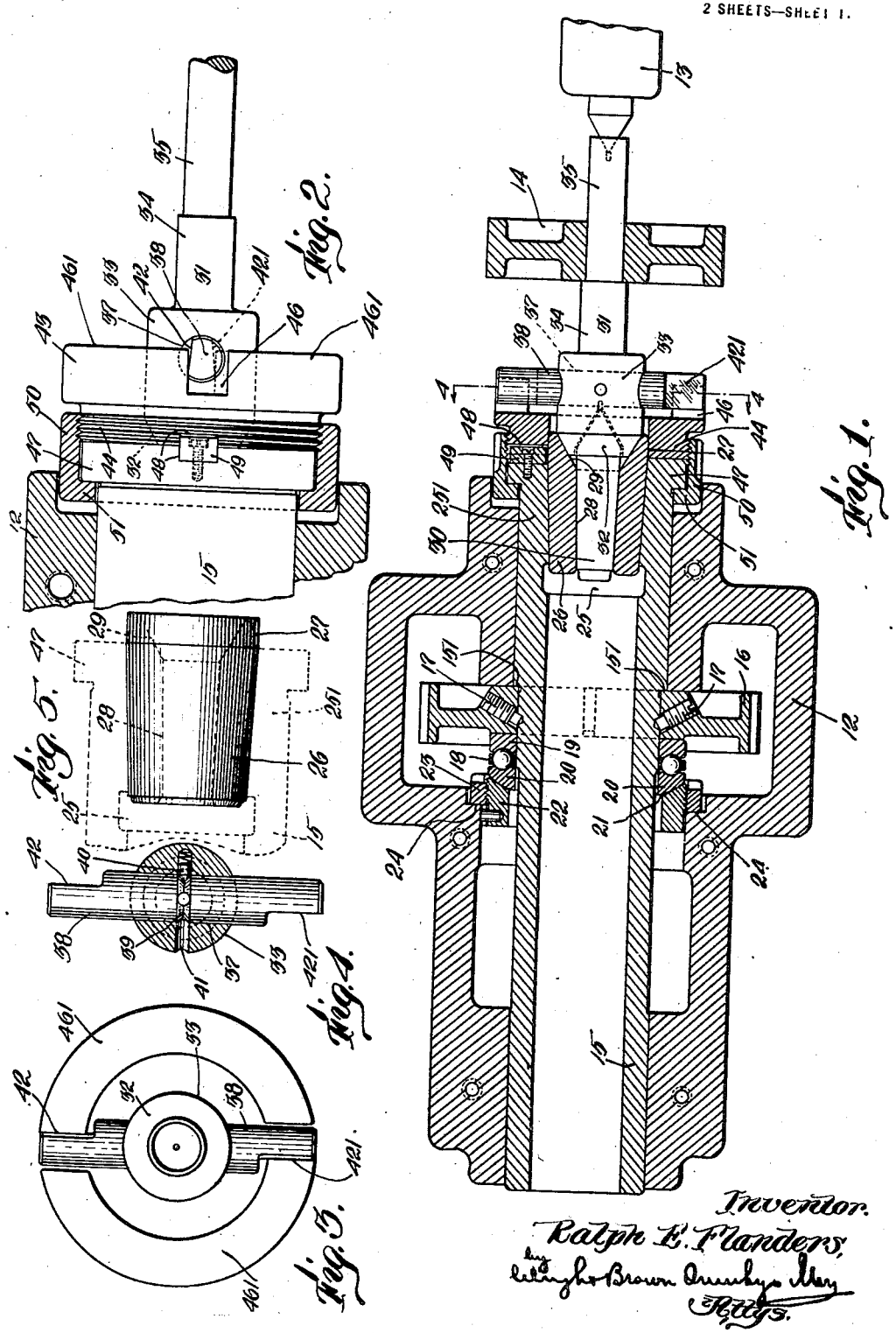

UNITED STATES PATENT OFFICE.

RALPH E. FLANDERS, OF SPRINGFIELD, VERMONT, ASSIGNOR TO JONES LAMSON MACHINE COMPANY, OF SPRINGFIELD, VERMONT, A CORPORATION OF VERMONT.

METAL-WORKING MACHINE.

1,368,790.  Specification of Letters Patent.  Patented Feb. 15, 1921.

Application filed December 31, 1919. Serial No. 348,518.

*To all whom it may concern:*

Be it known that I, RALPH E. FLANDERS, a citizen of the United States, residing at Springfield, in the county of Windsor and State of Vermont, have invented new and useful Improvements in Metal - Working Machines, of which the following is a specification.

The present invention has relation to spindles, such as employed in lathes, for centering and rotating the work to be operated on by the tools. It is necessary or desirable to provide the spindle with means for centering and holding detached pieces of work of different conformations, such as work arbors, bars, gear blanks, and the like, some of which are held between centers and others of which are held in a chuck. The spindle therefore should be so constructed as to hold a center pin, an arbor or a chuck, as may be desired, in proper axial alinement with the spindle. This is accomplished in accordance with the present invention, by providing a tapering recess in the end of the spindle and employing therein a complemental bushing which has a double internal taper, to receive either a tapered center or center pin, or the tapered end of a work arbor. The bushing projects from the end of the spindle and its projecting end is cylindrical, so as to locate centrally either the drive plate by which the arbor is rotated or else the chuck. Other details of a spindle illustrated as embodying the invention will be described in connection with the accompanying drawings, of which:—

Figure 1 illustrates the spindle in section, and shows its head end as engaged with an arbor.

Fig. 2 represents a plan view, partially in section of some of the parts shown in Fig. 1.

Fig. 3 represents a front view of the arbor and the driving plate.

Fig. 4 represents a section on the line 4—4 of Fig. 1.

Fig. 5 shows the bushing, the end of the spindle being indicated by dotted lines.

Fig. 6 illustrates the arbor.

Fig. 7 is an end elevation of the arbor.

Fig. 8 illustrates the driving plate.

Fig. 9 is a side view of the chuck attached to the spindle with the collar in section.

Fig. 10 shows a face view of the chuck.

Fig. 11 shows another form of drive plate provided with driving members to drive the arbor.

The same reference characters indicate the same parts wherever used throughout the drawings.

12 represents the head stock of the machine, 13 the tail stock, and 14 the article to be wrought upon. 15 represents a spindle for revolving the work and 16 the gear fastened to the spindle. Coöperating with this gear, are other gears or equivalent means connecting it with a source of power not shown, whereby the spindle 15 is revolved. Gear 16, keyed to spindle 15, is held against the shoulder 151 by means of screws 17.

Adjacent the gear wheel 16 is a ball-thrust bearing 18, the race ring 19 thereof abutting the hub of gear 16, and the other race ring 20 having its rear face spherically rounded at 21. Coöperating with the spherical face of race ring 20 is an adjusting ring 22, having a beveled face. The adjusting ring is externally screw threaded at the end opposite the beveled face to coöperate with the internal screw threads of a collar 23, which abuts a shoulder 24 on the head stock. It is apparent from this construction that tightening or loosening of the thrust bearing against the gear wheel may be accomplished by rotating collar 23 on ring 22, and thereby the gear wheel is thrust against shoulder 151 of the spindle and wear is compensated for and longitudinal lost motion of the spindle prevented.

The head end of the spindle 15 is recessed at 25 and adjoining said recess and forward end thereof the bore of the spindle is gradually tapered outwardly through the head 251. A bushing 26 of hardened steel is exteriorly tapered to fit the tapered bore of the spindle and projects a short distance beyond the end of the spindle. This projecting portion is not tapered but is cylindrical in contour. Bushing 26 has two internal tapered bores 28 and 29. The taper of bore 28 is gradual and at a very acute angle to the axis of the bushing and conforms with the taper of a lathe "center" or center pin 30, while the taper of the bore 29 is more abrupt and at an angle less acute to the axis of the bushing and adapted to conform to the tapered end 32 of the head 33 of the work arbor 31.

To the rear of the head, the arbor 31 comprises a series of cylindrical portions 34, 35, of different diameter to conform to gear blanks and the like of various internal diameters, to be wrought upon. The arbor head is provided with a cylindrical bore 37 transverse of its axis and adapted to receive a cylindrical swivel pin 38. The swivel pin is provided midway of its length with a circumferential groove 39. Seated in a socket in the head 33 at right angles to and opening into the bore 37 is a spring pressed pin 40; said pin being shaped at one end to fit in the groove 39 of the swivel pin. 41 indicates an opening through which pin 40 may be inserted. The pin 40 projecting into the groove 39 prevents longitudinal movement of pin 38 with respect to the bore 37 and at the same time permits said pin to rotate in said bore.

On opposite sides of pin 38 are flattened faces adjacent its ends at 42 and 421. These faces do not lie in parallel planes, but are in planes which converge as shown in Fig. 2, for a purpose to be described.

The cylindrical portion 27 of bushing 26 is adapted to form a pilot for centering a driving plate 43 carrying either a chuck or else members for driving a work arbor. The drive plate has a projection which is centered on the cylindrical end 27 of bushing 26. The spindle 15 has at its head end an outstanding flange 47, and fastened to said flange is a key or block 49 made of hard steel so as to resist wear and strain and which is adapted to fit in a socket or recess 48 in the drive plate. Mounted to surround the cylindrical projection 44 is a collar 50 having an inturned flange 51 at one end adapted to abut against the inner face of the flange 47. The internal opposite end of the collar 50 is screw threaded to coöperate with the screw threads on the member 43. The collar 50 operates to draw the driving plate against the head end of the spindle, and the key 49 fitting into notch 48 prevents the drive plate from rotating relative to the spindle, when the drive plate is so drawn into place.

The driving plate may be provided with driving members which are disposed at diametrically opposite sides of the spindle axis, and which are utilized together with a transverse swivel pin on the work arbor, in imparting a balanced drive to the latter. These members, in the construction shown in Fig. 2, consist of segments 461, 461, formed by notching a flange on the drive plate as shown at 46. The segments, in this case, have flat end faces as shown, to engage the flattened ends of the swivel pin as will be described. If desired, however, these drive members may consist of studs 462 projecting from the face of the drive plate, as shown in Fig. 11. In either case, when the spindle has rotated slightly or far enough for one of the driving members to engage the end of the pin, the latter rotates until its other end engages the other member, whereupon both members bear with the same pressure against the pin, and power is thus applied equally on diametrically opposite sides of the arbor. In this operation, because of the fact, that the faces on the pin are in convergent planes, when one of the members comes in contact with one end of the pin, it engages an edge or corner thereof and rotates the pin about its axis, and, before the pin has been rotated far enough for the member to bear across the entire face of the pin, the edge or corner at the other end of the pin engages the other member.

Without the employment of a pin which can rotate on its own axis as herein described, one end of the pin would be out of contact with its complemental driving member and the force would be exerted all at one end of the pin, with the possibility of decentralizing the arbor in respect of the spindle and loosening the connection between the arbor and the spindle; while by the above construction these objections are avoided.

Instead of the arbor and drive plate it may be desirable to use a chuck such as is illustrated at 52 in Figs. 9, 10 and 11. Such a chuck may be provided with a back or drive plate 53 centered on the cylindrical end 27 of the bushing 26, and held flush against the face of the flange 47 by means of collar 50.

The bushing 26, because of its cylindrical end portion and the double taper of its bore, is adapted to center and hold in place either a center pin for use in holding bars or the like, a work arbor adapted for holding pulleys or gear blanks, a drive plate for use with the arbor, or else a chuck adapted for use with still a different class of work.

By supporting a work arbor, such as shown in Fig. 6, with the beveled end 32 in the tapered end 29 of the bushing, I am able to secure a much stiffer support for the arbor than when it is mounted in both ends in center pins in the usual way. This permits the taking of heavier cuts with less chatter and destruction of the cutting edges on the tools. Thus the improvement herein described, adds materially to the quantity and quality of the work produced by the lathe as a whole.

Moreover, by means of the swivel pin 38, I have effected an automatic adjustment whereby a balanced drive is obtained, i. e., since the pin 38 is adapted to adjust itself so as to contact with diametrically arranged driving members on the drive plate, instead of a one sided drive as in the ordinary devices of this nature. This as stated, not only prevents decentralization and disconnection of parts, but insures an even wear of parts which is highly desirable.

Instead of arranging the flat faces 42 and 421 in converging planes, the faces of segments 461 may be arranged in converging planes, the faces 42 and 421 being in parallel planes, without altering the effect in obtaining a balanced drive as set forth above. Similarly, the drive members 462 may be inclined in converging planes with the faces 42 and 421 in parallel planes.

Having thus explained the nature of my said invention and described a way of making and using the same, although without attempting to set forth all of the forms in which it may me made or all of the modes of its use, what I claim is:—

1. In combination with a spindle having a bore tapering outwardly, a bushing having a tapered portion adapted to fit the tapered bore of the spindle, said bushing having two internal tapers of different angles to the axis of the bushing and a portion projecting beyond the spindle.

2. In combination with a spindle having a tapered bore, a bushing seating in said tapered bore and having a cylindrical portion extending beyond the end of said spindle and having two internal tapers whereby said bushing is adapted to center a drive plate, a work arbor or a center pin and thereby adapt the machine for a variety of work.

3. In combination with a spindle, a drive plate attached thereto for rotation therewith, members projecting from one face of the drive plate and located on opposite sides of the axis thereof, a work arbor centered with respect to said drive plate, a pin transversely mounted in one end of said arbor and having flat-faced ends, and driving members on said drive plate for engaging the flat faces of said pin to secure a balanced drive of said arbor.

4. In combination with a spindle, a drive plate attached thereto for rotation therewith, a work arbor centered with respect to said drive plate, a swiveling pin mounted in one end of the arbor adjacent said driving element and having faces lying in converging planes and members on said driving element for engaging said faces, whereby when the spindle rotates, one of said members will contact with the corresponding flat face and rotate the pin until the other member contacts with the corresponding flat face, and a balanced drive is obtained.

5. In combination with a spindle having a conical bore in one end thereof, a bushing having a conical portion adapted to seat in said conical bore, a cylindrical portion projecting beyond said spindle and a conical bore, a drive plate centered on the cylindrical portion of the bushing and attached to the end of the spindle for rotation therewith, said drive plate having diametrically opposite driving members, a work arbor having a conical portion centering in the conical bore of the bushing, and having a transverse cylindrical swiveling pin, said pin having flattened faces adjacent its ends lying in converging planes and adapted to be respectively engaged by said driving members, whereby said arbor is centered in respect of the spindle and a balanced drive thereof is obtained.

6. In combination with a spindle, a drive plate mounted thereon to rotate therewith and having diametrically opposite driving members, an arbor having a head thereon centered in said spindle, a swiveling pin mounted transversely in said head, and means for preventing longitudinal movement of the transverse pin and permitting rotary movement thereof the ends of the pin having flat faces on opposite sides thereof lying in coverging planes, and adapted to be engaged by said driving members in such manner as to impart a balanced drive to the arbor from the spindle.

7. A work arbor adapted to be centered in a lathe spindle and to be driven thereby, said arbor having a transverse pin journaled therein with faces at its ends adapted for engagement with spaced driving members on the spindle, certain of said faces being arranged in converging planes whereby a balanced drive is obtained when the spindle is rotated.

8. A work arbor having a head at one end adapted to engage a spindle, a transverse pin journaled in said head, and means for holding said pin against endwise movement, said pin having at its ends flat faces arranged in convergent planes substantially as described.

9. A work arbor adapted to be centered in a lathe spindle and to be driven thereby, said arbor having a transverse pin, journaled therein, driving members on the spindle, flat surfaces on the ends of the transverse pin, and surfaces on the driving members, adapted to be brought into contact with the surfaces on the driving members, certain of said surfaces being inclined in converging planes whereby a balance drive is obtained.

10. In combination with a spindle having a bore tapering outwardly, a bushing having a tapered portion adapted to fit the tapered bore of the spindle, said bushing having two internal tapers of different angles to the axis of the bushing.

In testimony whereof I have affixed my signature.

RALPH E. FLANDERS.